(12) United States Patent
Kurosawa

(10) Patent No.: US 6,825,957 B1
(45) Date of Patent: Nov. 30, 2004

(54) CARTRIDGE FILM SCANNING SYSTEM

(75) Inventor: Yuichi Kurosawa, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/340,432

(22) Filed: Jun. 28, 1999

(30) Foreign Application Priority Data

Jun. 29, 1998 (JP) .......................................... 10-182465
Jun. 29, 1998 (JP) .......................................... 10-182469

(51) Int. Cl.⁷ .............................................. H04N 1/04
(52) U.S. Cl. ....................... 358/487; 358/474; 396/512; 396/511; 348/96
(58) Field of Search ................................ 358/487, 474; 355/75, 40, 41, 68; 396/277, 278, 279, 512, 511

(56) References Cited

U.S. PATENT DOCUMENTS

| | | | |
|---|---|---|---|
| 5,677,759 A | * 10/1997 | Tanimoto et al. .............. 355/7 |
| 5,806,778 A | * 9/1998 | Yanagimoto .............. 242/348.4 |
| 5,997,190 A | * 12/1999 | Natsume ...................... 396/567 |
| 6,433,824 B1 | * 8/2002 | Tanaka et al. .............. 348/345 |

* cited by examiner

Primary Examiner—Kimberly Williams
Assistant Examiner—Negussie Worku
(74) Attorney, Agent, or Firm—Greenblum & Bernstein, P.L.C.

(57) ABSTRACT

A cartridge film scanning system includes a film scanner and a cartridge film adapter for the film scanner. A cartridge film to be scanned by the film scanner is loaded in the cartridge film adapter. The cartridge film adapter is inserted in the film scanner when the film is scanned. The cartridge film adapter is provided with a film rewinding system, a battery for the film rewinding system, and a switch mechanism which connects the battery and the film rewinding system when the cartridge film adapter is removed from the film scanner.

20 Claims, 11 Drawing Sheets

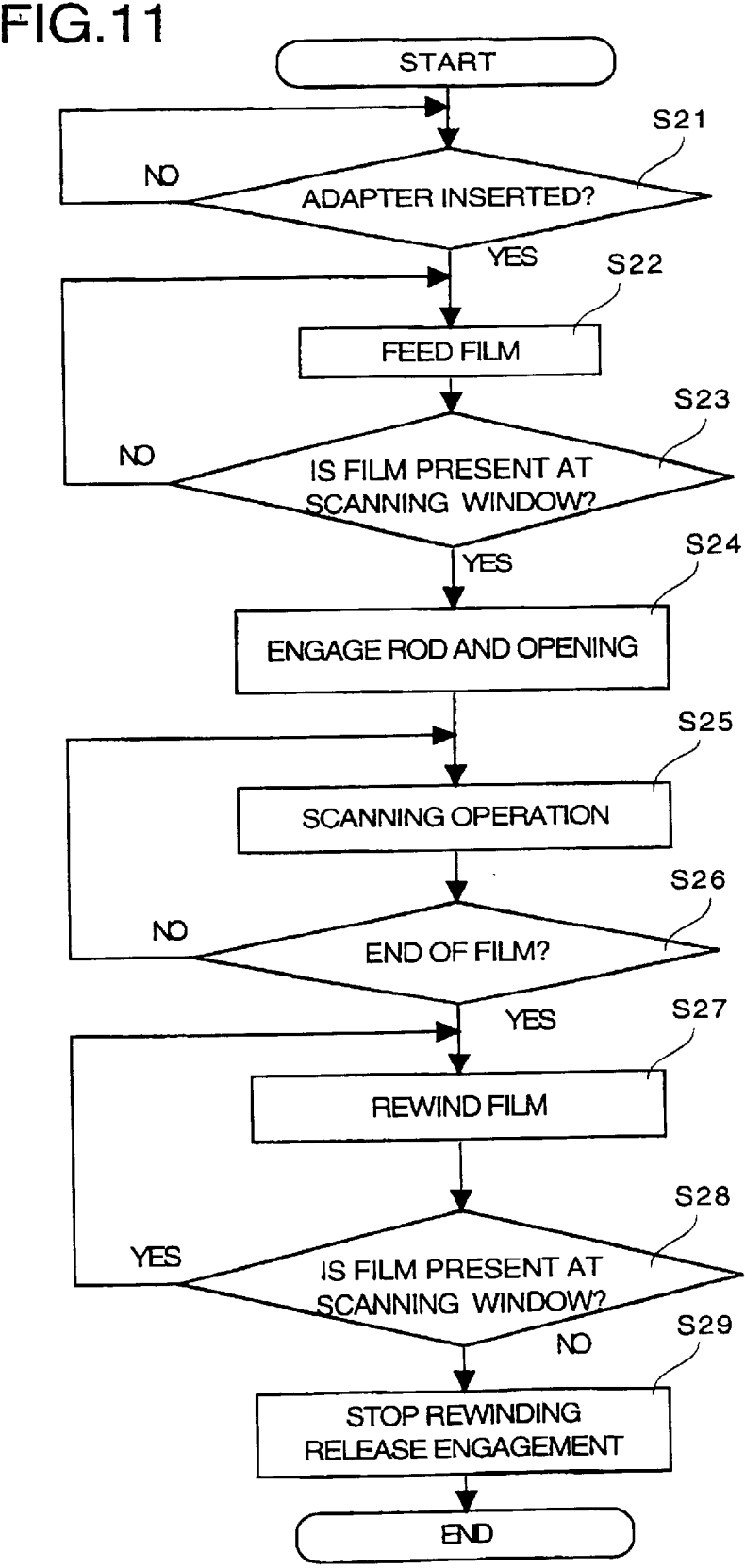

CARTRIDGE FILM SCANNING SYSTEM

BACKGROUND OF THE INVENTION

The present invention relates to a cartridge film scanning system having a scanner and a cartridge film adapter which is inserted in the scanner.

Conventionally, a film scanner for scanning images formed on the film has been known. The scanned images are saved as image data and utilized in a computer, or the scanned images are converted into image signals and transmitted to a display system such as a television set for display.

When a scanner utilizes a 35 mm film, a developed film is directly inserted in the film scanner. In case of a film for the APS (Advanced Photographing System), however, the developed film is held in a film cartridge, and therefore, in order to scan the images formed on the APS film (hereinafter, referred to as a cartridge film), a particular adapter for the cartridge film should be utilized. The APS film is inserted in such a cartridge film adapter, and then the cartridge film adapter is inserted in a scanner.

In such a scanning system, when a scanning operation for scanning the images formed on the cartridge film is finished, the film is to be rewound and completely accommodated in the cartridge.

If the adapter is withdrawn from the scanner when the film is not rewound, and if an operator attempts to remove the film cartridge from the adapter, the cartridge may not be removed since the film is taken out from the cartridge and held by the adapter. Further, since the film is exposed to outside, especially at an opening for scanning, particles of dust may be adhered or scratches may be formed onto the film surface, which deteriorates quality of images when the images are printed or scanned again.

SUMMARY OF THE INVENTION

It is therefore an object of the invention to provide an improved cartridge film scanning system which is free from the above-described defects.

For the above object, according to the present invention, there is provided a cartridge film adapter for a film scanner. A cartridge film to be scanned by the film scanner is loaded in the cartridge film adapter. The cartridge film adapter is then inserted in the film scanner. The cartridge film adapter is provided with:

- a detection system that detects whether the cartridge film adapter is removed from the film scanner; and
- a film rewinding system that rewinds the film only when removal of the cartridge film adapter is detected by the detection system.

Thus, it is ensured that the film is rewound when the cartridge film adapter is not inserted in the film scanner.

According to another aspect of the invention, the cartridge film adapter is provided with:

- a film rewinding system;
- a battery for the film rewinding system; and
- a switch mechanism which connects the battery and the film rewinding system when the cartridge film adapter is removed from the film scanner.

Thus, also in this case, it is ensured that the film is rewound when the cartridge film adapter is not inserted in the film scanner.

According to a further aspect of the invention, there is provided a cartridge film scanning system, which includes a film scanner and a cartridge film adapter for the film scanner. A cartridge film to be scanned by the film scanner is loaded in the cartridge film adapter, and the cartridge film adapter is inserted in the film scanner.

The cartridge film adapter is provided with:

- a film rewinding system;
- a battery for the film rewinding system; and
- a switch mechanism which connects the battery and the film rewinding system when the cartridge film adapter is removed from the film scanner.

Thus, it is ensured that the film is rewound when the cartridge film adapter is not inserted in the film scanner.

Optionally, the battery may be a rechargeable battery, and a charging circuit for charging the rechargeable battery is provided in the film scanner.

Preferably, the battery may be fully charged before scanning operation is performed. Then, whenever the cartridge film adapter is removed, it is ensured that the film will be completely rewound.

It is preferable that the rechargeable battery has capacity necessary for completely rewinding a fully extracted film.

According to another aspect of the invention, there is provided a cartridge film scanning system, provided with:

- a film scanner;
- a cartridge film adapter for the film scanner, a cartridge film to be scanned by the film scanner being loaded in the cartridge film adapter, the cartridge film adapter being inserted in the film scanner when the film is scanned; and
- an engaging mechanism for engaging the cartridge film adapter with the film scanner, engagement between the cartridge film adapter and the film scanner being released after the film is rewound.

Thus, it is ensured that the film has been rewound when the cartridge film adapter is withdrawn from the film scanner.

Optionally, the film scanner has a scanning window at which a frame of image formed on the film is to be located, and the cartridge film scanning system has a detector for detecting whether a film is located at the scanning window. Engagement between the cartridge film adapter and the film scanner is released if the detector detects that a film is absent at the scanning window.

In particular, the engaging mechanism may be provided with:

- a solenoid provided with a movable rod; and
- an engaging member which can be engaged with and released from the movable rod. Further, the solenoid is provided to one of the film scanner and the cartridge film adapter, and the engaging member is provided to the other of the film scanner and the cartridge film adapter.

Further preferably, the solenoid may be provided to the cartridge film adapter, and an opening to be engaged with the movable rod may be formed on a holder of the film scanner which receives the inserted adapter.

BRIEF DESCRIPTION OF THE ACCOMPANYING DRAWINGS

FIG. 1 is a perspective view of a film scanner and a cartridge film adapter to which the embodiments of the invention are applicable;

FIG. 2 schematically shows a constitution of the cartridge film adapter according to the first embodiment of the invention;

FIG. 3 schematically shows a winding/rewinding mechanism employed in the cartridge film adapter;

FIG. 4 is a cross section of a switch mechanism;

FIG. 5 schematically shows a constitution of an insertion portion of the film scanner and the cartridge film adapter according to the first embodiment of the invention;

Figure 8:
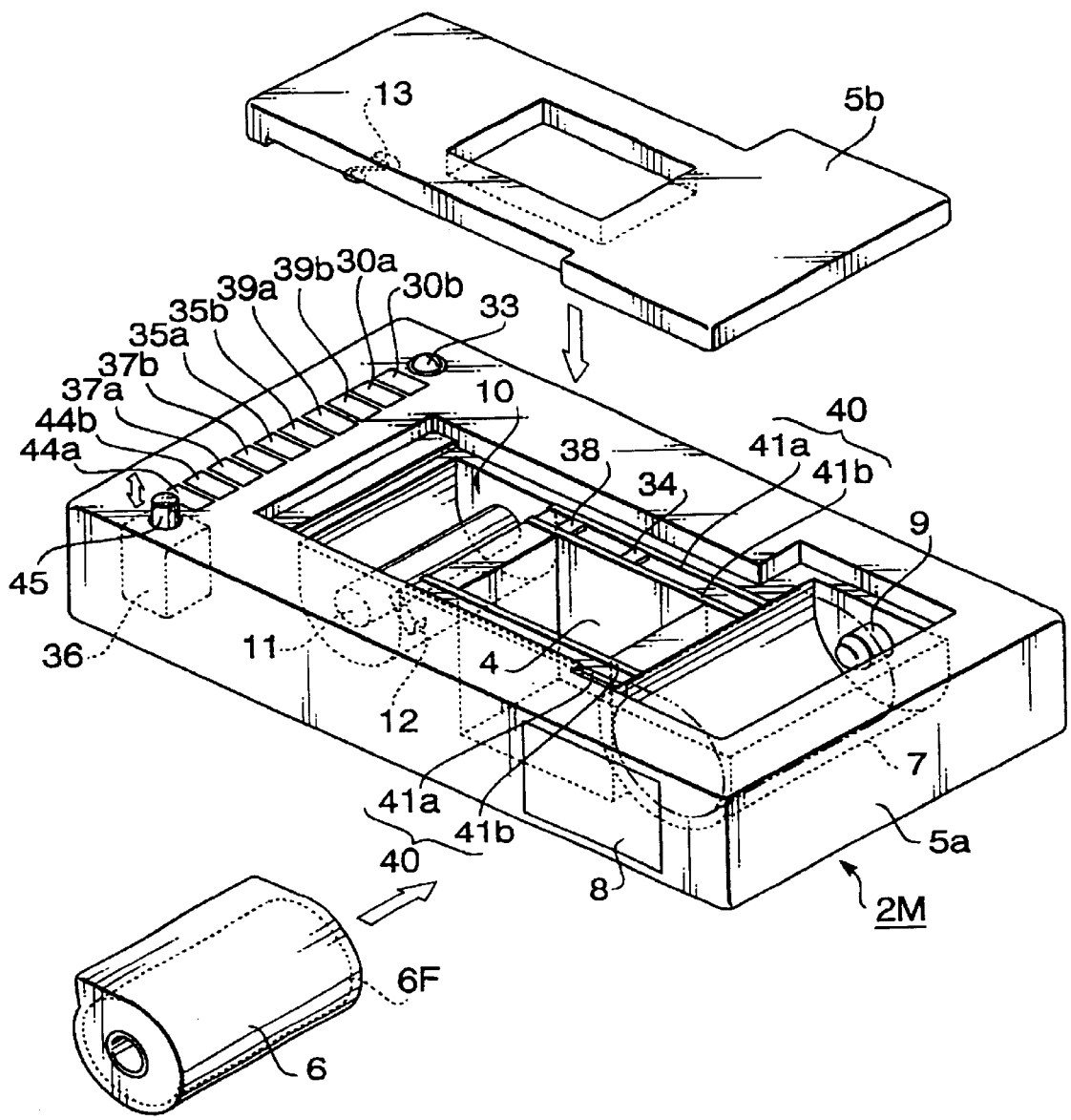
Figure 9:
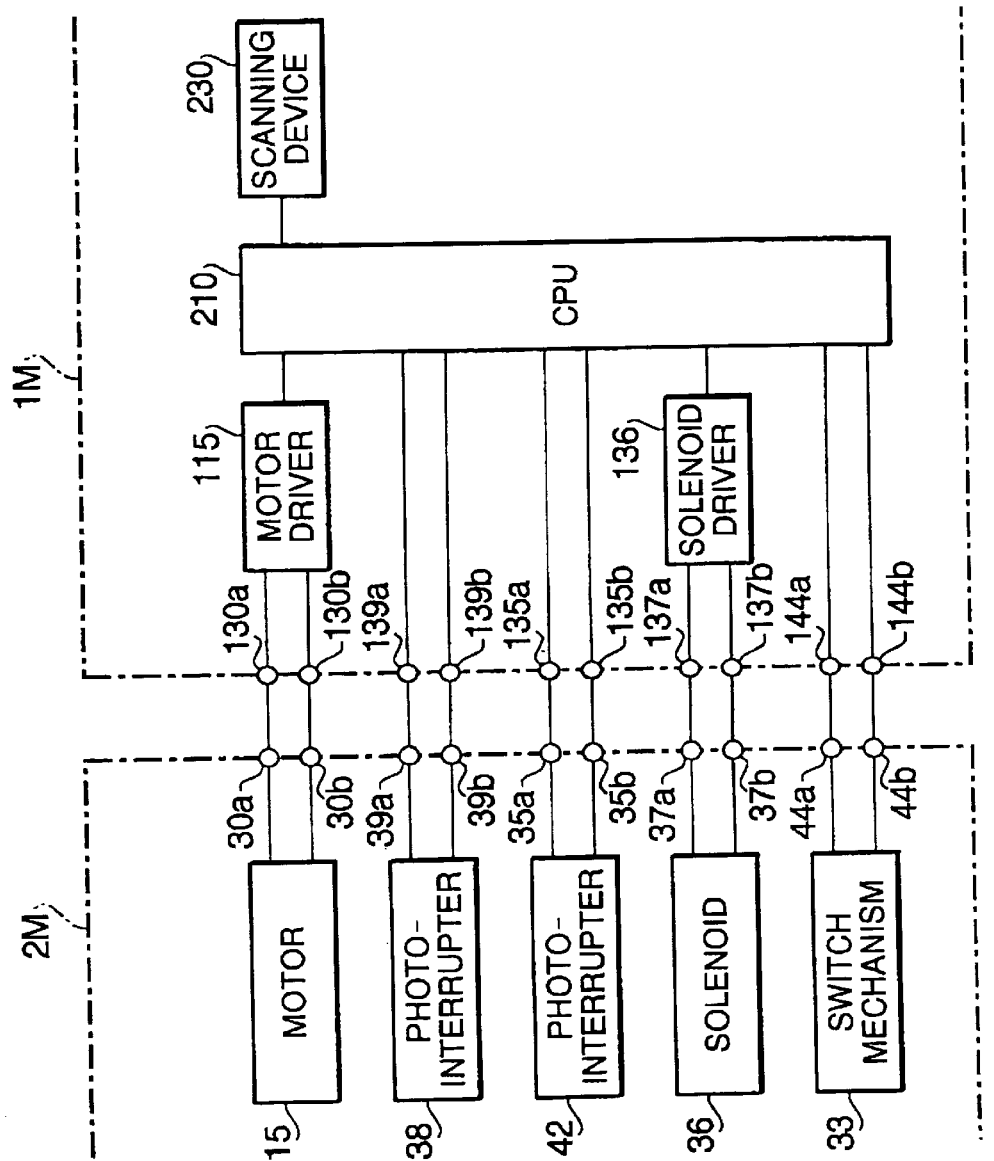
Figure 10:
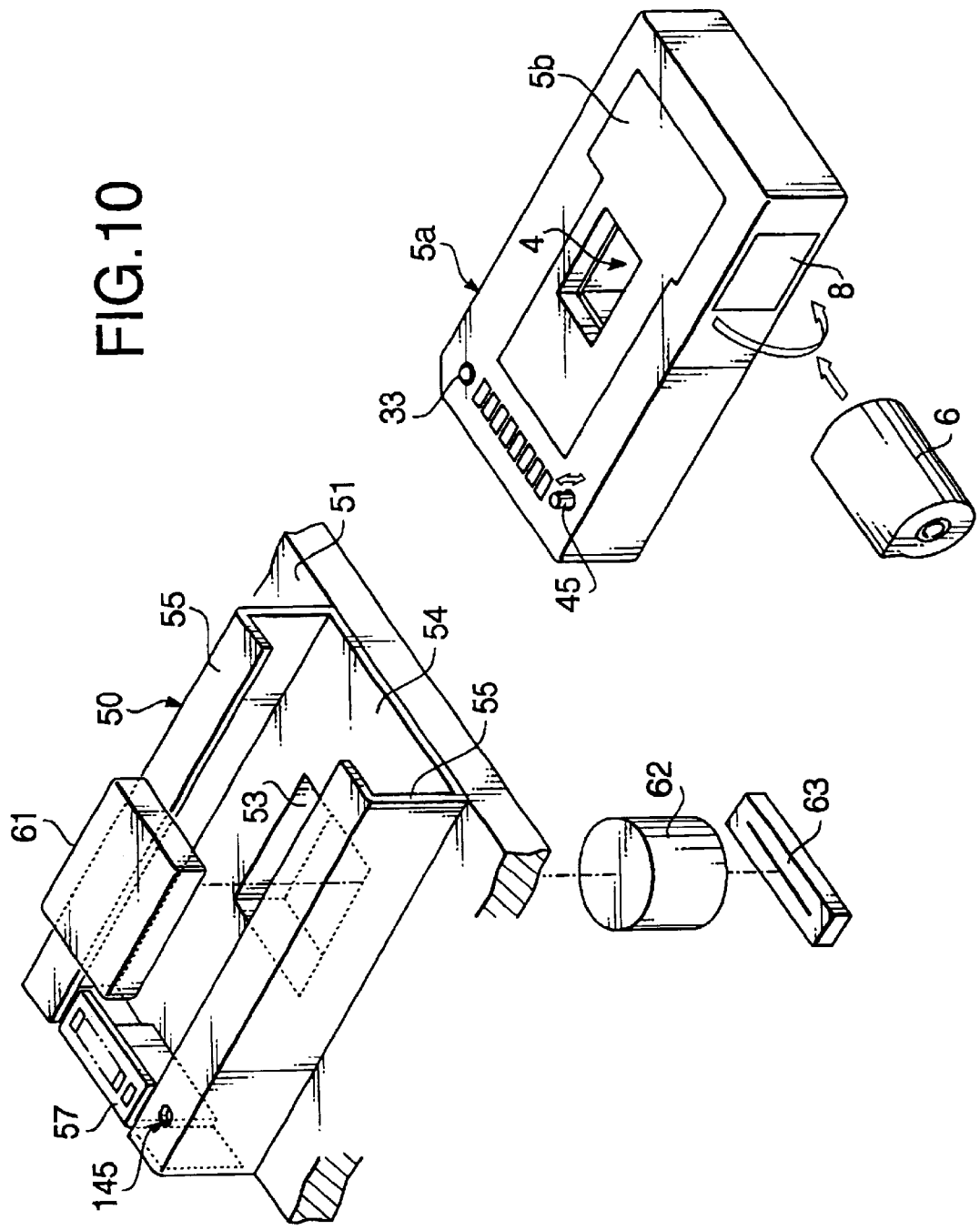

FIG. 8 schematically shows a constitution of the cartridge film adapter according to the second embodiment of the invention;

FIG. 9 is a diagram showing an electrical constitution of the film scanner and the cartridge film adapter;

FIG. 10 schematically shows a constitution of an insertion portion of the film scanner and the cartridge film adapter according to the second embodiment; and FIG. 11 is a flowchart illustrating an image scanning procedure according to a second embodiment of the invention.

DESCRIPTION OF THE EMBODIMENTS

Figure 1:
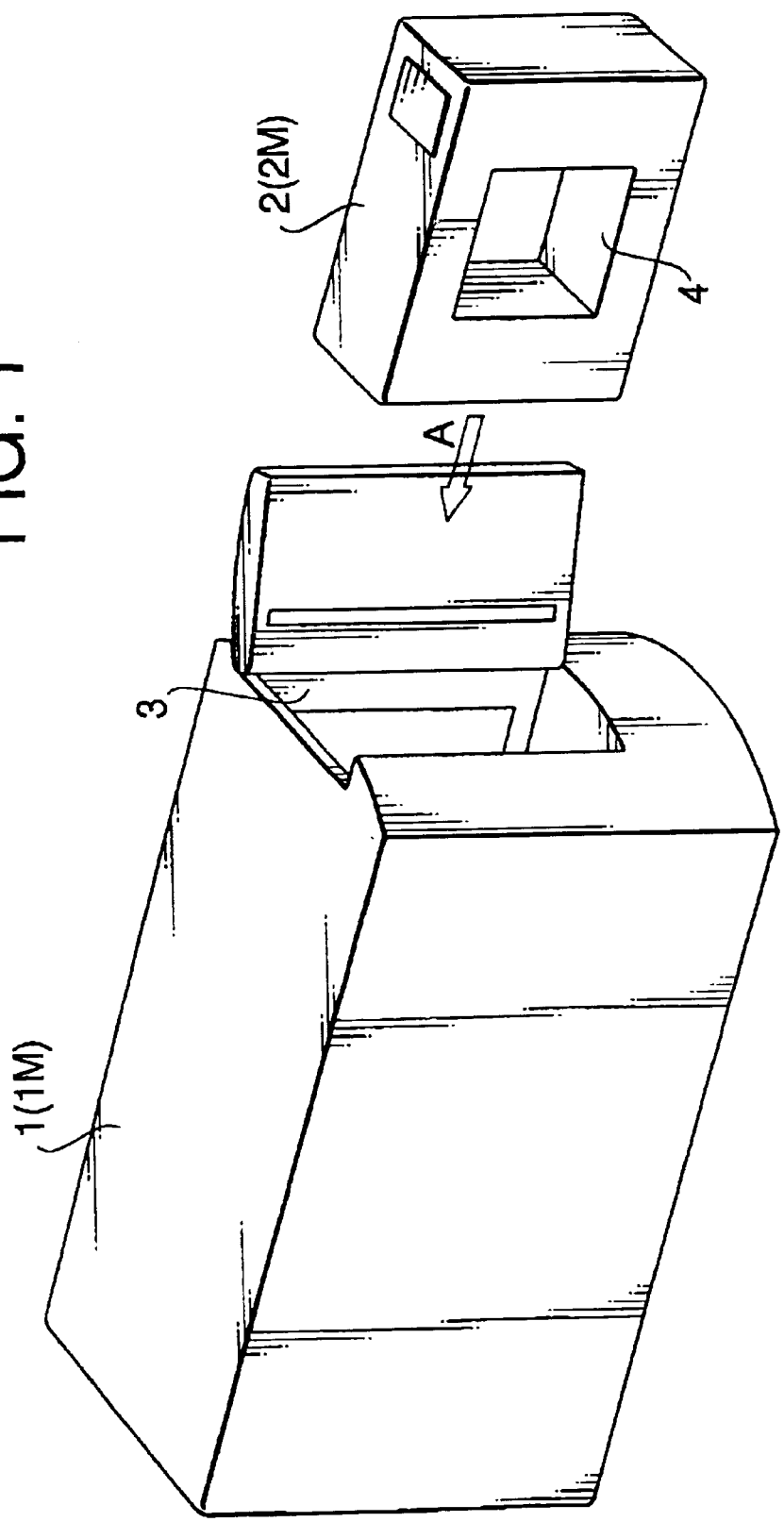

FIG. 1 is a perspective view schematically showing a film scanning system, which includes a film scanner 1 and a cartridge film adapter 2 to which embodiments of the present invention are applicable.

The film scanner 1 is formed with an insertion opening 3 through which the cartridge film adapter 2 is inserted along arrow A shown in FIG. 1. At a central portion of the cartridge film adapter 2, a rectangular opening 4 is formed. When the cartridge film adapter 2 is inserted in the film scanner 1, a frame of image formed on the cartridge film (e.g., an APS film) is located to face the opening 4, a back light provided on the scanner 1 illuminates the frame of the image from behind, and the image located at the opening 4 is scanned by means of a CCD or the like. The scanned image is output through an output port provided on the scanner 1. The output signal may be used for display the image on a display system, or stored in a recording medium.

Figure 2:
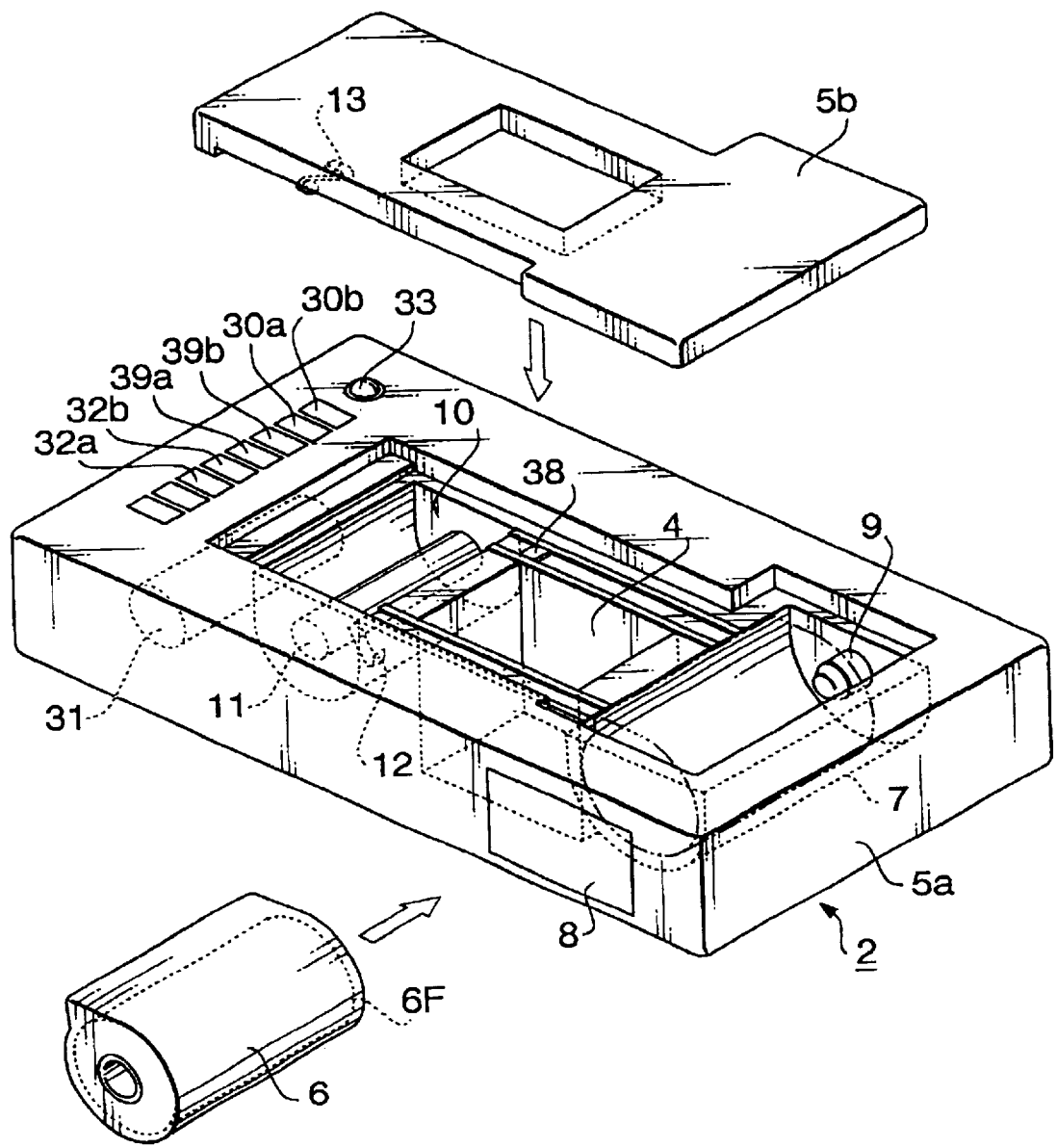

FIG. 2 schematically shows a constitution of the cartridge film adapter 2.

The cartridge film adapter 2 has a body 5a and a back cover 5b. The body 5a is formed with a cartridge chamber 7 for holding a film cartridge 6. On a side surface of the cartridge film adapter 2, an openable cover plate 8 is provided at a position facing the film cartridge chamber 7. When the film cartridge 6 is inserted in the cartridge chamber 7 and the cover plate 8 is closed, a fork 9 provided in the cartridge chamber 7 is engaged with a rotation shaft of the film cartridge 6. On a side opposite to the cartridge chamber 7, with respect to the opening 4, a spool section 10 is formed for taking up the film 6F. A winding spool 11 is provided in the spool section 10. When the fork 9 is rotated to wind (i.e., to feed) the film 6F accommodated in the film cartridge 6, the film 6F proceeds across the opening 4, and reaches the spool section 10. At the spool section 10, the film 6F is biased towards the winding spool 11 by a spool pressing member 12 provided on the body 5a and by a film pressing member 13 provided on the back cover 5b. As the film 6F is fed and the winding spool 11 is rotated further, the film is taken up by the winding spool 11. It should be noted that the fork 9 and the winding spool 11 rotate simultaneously by a winding/rewinding mechanism 14 which will be described below.

Figure 3:
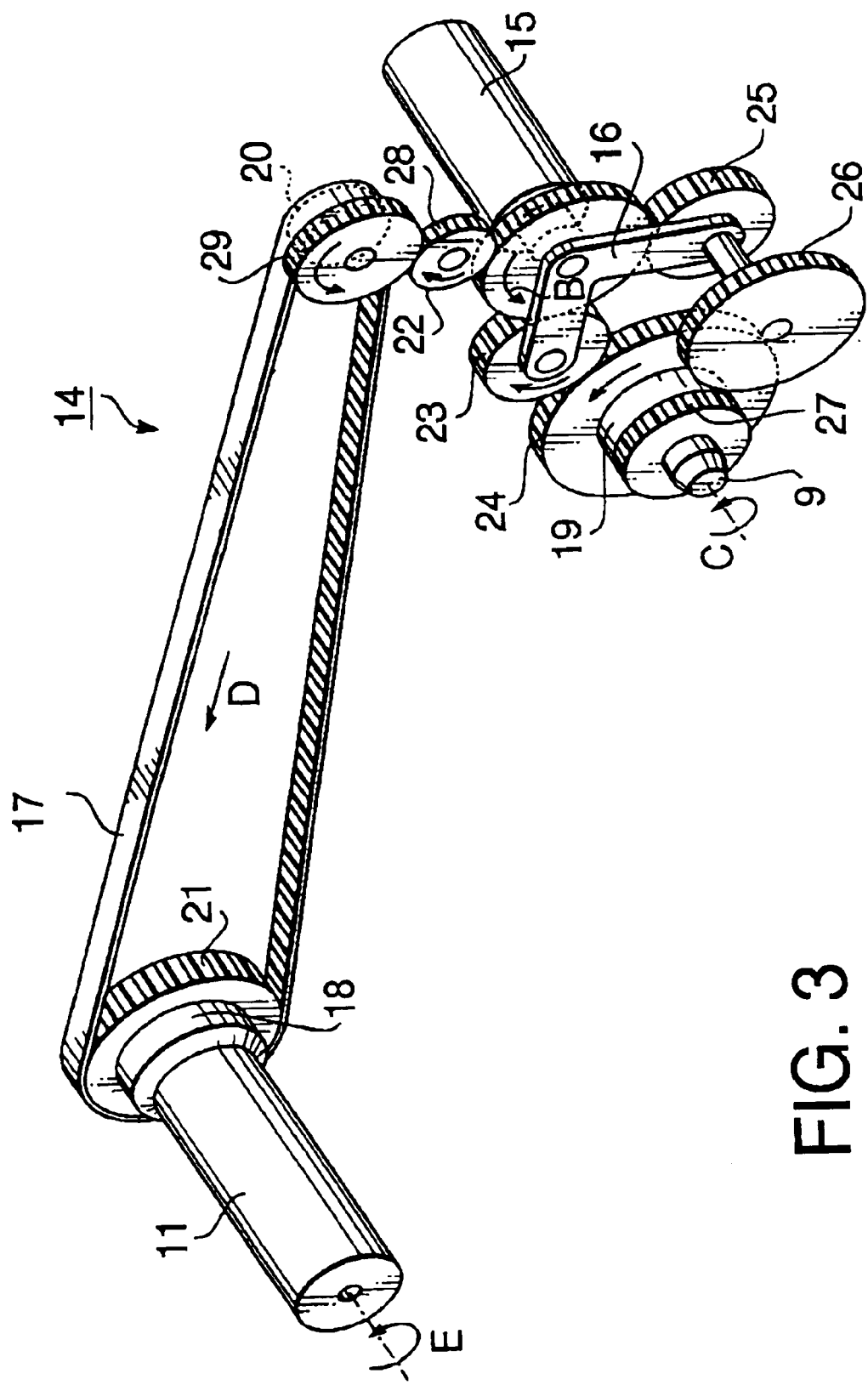

FIG. 3 schematically shows the structure of the winding/rewinding mechanism 14.

The winding/rewinding mechanism 14 includes a motor 15, an arm 16, a belt 17, one-way clutches 18 and 19, pulleys 20 and 21, and gears 22–29.

In order to wind the film 6F, the motor 15 is driven to rotate the gear 22 in a direction indicated by arrow B. Then, the arm 16 is rotated in the same direction, and the gear 23 is engaged with the gear 24. The rotational force of the gear 22 is transmitted to the gear 23 held by the arm 16, and then to the gear 24. The rotational force of the gear 24 is further transmitted to the one-way clutch 19, gear 27, and then rotates the fork 9 in a direction indicated by arrow C. The one-way clutch 19 is a clutch that transmits the rotational force of the gear 24 to the gear 27 in one direction (i.e., in direction C), and does not transmit the rotational force in the opposite direction. As the fork 9 rotates in the direction indicated by arrow C, the film 6F accommodated in the film cartridge 6 is fed towards the spool section 10. In the spool section 10, as the motor 15 is rotated, the gear 22 rotates, and then via the gears 28, 29, and the pulley 20, the belt 17 is driven in a direction indicated by arrow D. As the belt 17 is driven, via the pulley 21 and the one-way clutch 18, the spool 11 is rotated in a direction indicated by arrow E.

The winding/rewinding mechanism 14 is constituted such that the winding amount of the film 6F by the spool 11 is slightly greater than the sending amount of the film 6F by the fork 9. Accordingly, when the film 6F is caught by the spool 11 and winding of the film starts, the gear 27 is driven to rotate by the film 6F. Since the rotation speed of the fork 9 when the film 6f is taken up by the spool 11 is faster than the rotation speed when the fork 9 is driven by the motor 15, the rotational force of the motor 15 is not transmitted to the fork 9 as the one-way clutch 19 is provided between the gears 24 and 27.

When the film 6F is rewound, the motor 15 is driven to rotate the gear 22 in a direction opposite to direction B. When the gear 22 is rotated in this direction, the arm 16 rotates in the same direction. Accordingly, the gear 23 is disconnected from the gear 22, and the gear 26 is engaged with the gear 27. Then, the rotational force applied to the gear 22 is transmitted to the gear 25 which is supported by the arm 16, and then transmitted via the gears 25, 26, and 27 to the fork 9. Since the fork 9 rotates in the direction opposite to direction C, the film 6F is fed from the spool section 10 to the cartridge 6. At this time, the rotational force of the motor 15 is transmitted towards the spool section 11 via the gears 22, 28 and 29, the pulley 20, the belt 17, and the pulley 21. The direction of rotation is opposite to the direction when the film 6F is wound. The one-way clutch 18 does not transmit the rotational force of the pulley 21, which rotates in the direction opposite to direction E, to the spool 11. Thus, the spool 11 is driven by the film, which is rewound, to rotate.

Electrical power of the motor 15 is supplied from a power source of the film scanner 1 via motor power supply terminals 30a and 30b (shown in FIG. 2) provided on the body 5a.

In the cartridge film adapter 2, separate from the power source of the film scanner 1, a secondary battery 31 is provided. The secondary battery 31 can be charged with a voltage applied through charging terminals 32a and 32b using the power source of the film scanner 1, which will be described later.

As described above, when the cartridge film adapter 2 is coupled to the film scanner 1, the power source of the film scanner 1 is used also as the power source of the motor 15.

When the cartridge film adapter 2 is removed from the film scanner 1, the power source for the winding/rewinding mechanism 14 is switched from the power source of the film scanner 1 to the secondary battery 31 accommodated in the cartridge film adapter 2. Switching of the power source described above, when the cartridge film adapter 2 is removed from the film scanner 1, is performed by a switch mechanism 33.

Figure 4:
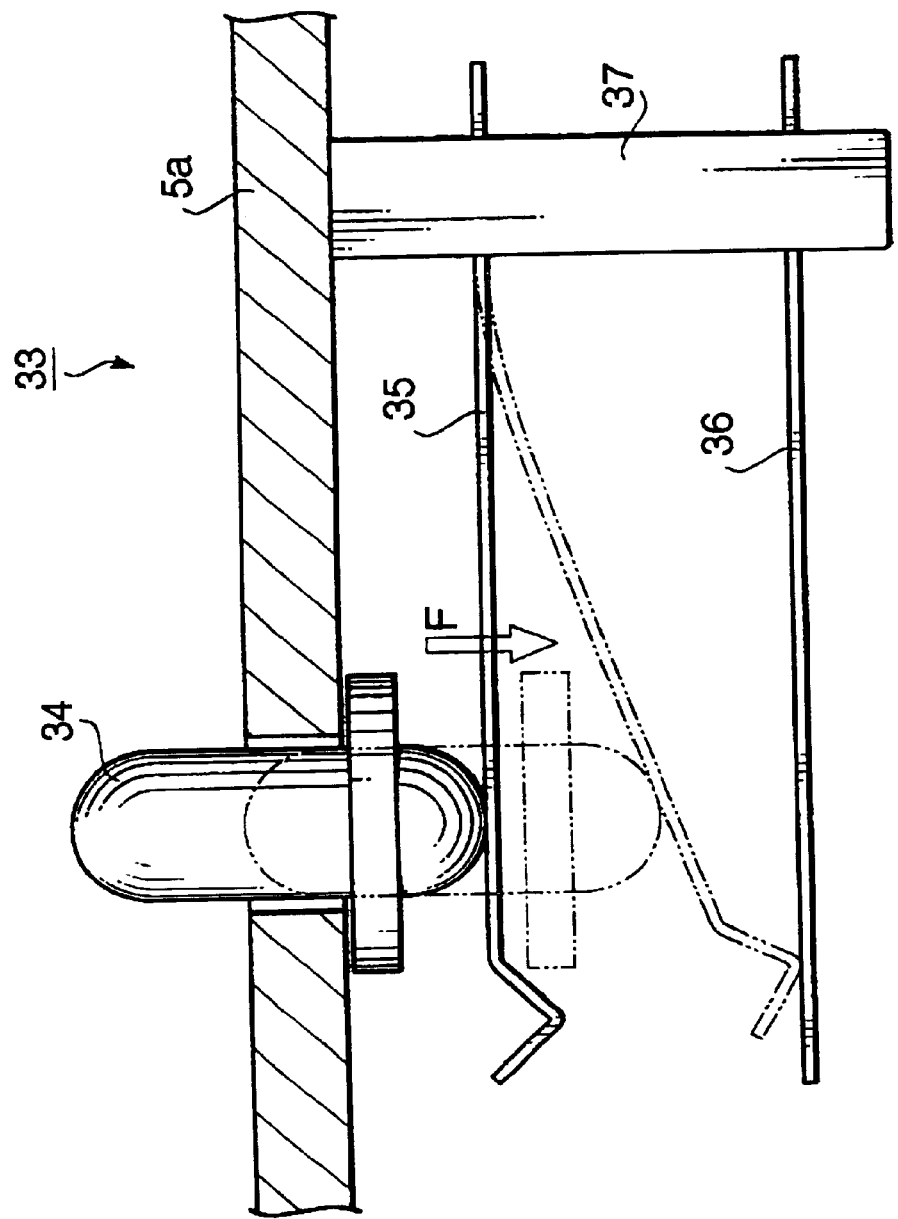

FIG. 4 shows the switch mechanism 33. As shown in FIG. 4, the switching mechanism 33 includes a detection knob 34, plate springs 35 and 36. The plate springs 35 and 36 are held in parallel with each other. The detection knob 34 is arranged such that one end (i.e., an upper side end in FIG. 4) thereof is protruded from an opening formed on the main body 5a of the cartridge adapter 2. The other end of the detection knob 34 is elastically supported by the plate spring 35.

When the cartridge film adapter 2 is inserted in the film scanner 1, the detection knob 34 is moved in a direction indicated by arrow F, and the distal end of the plate spring 35 contacts the plate spring 36, as shown by two-dotted line in FIG. 4. In accordance with the contacting status of the plate spring 35 with respect to the plate spring 36, the power source of the winding/rewinding mechanism 14 is switched between the power source of the film scanner 1 and the secondary battery 31, which will be described with reference to FIG. 6.

Figure 6:
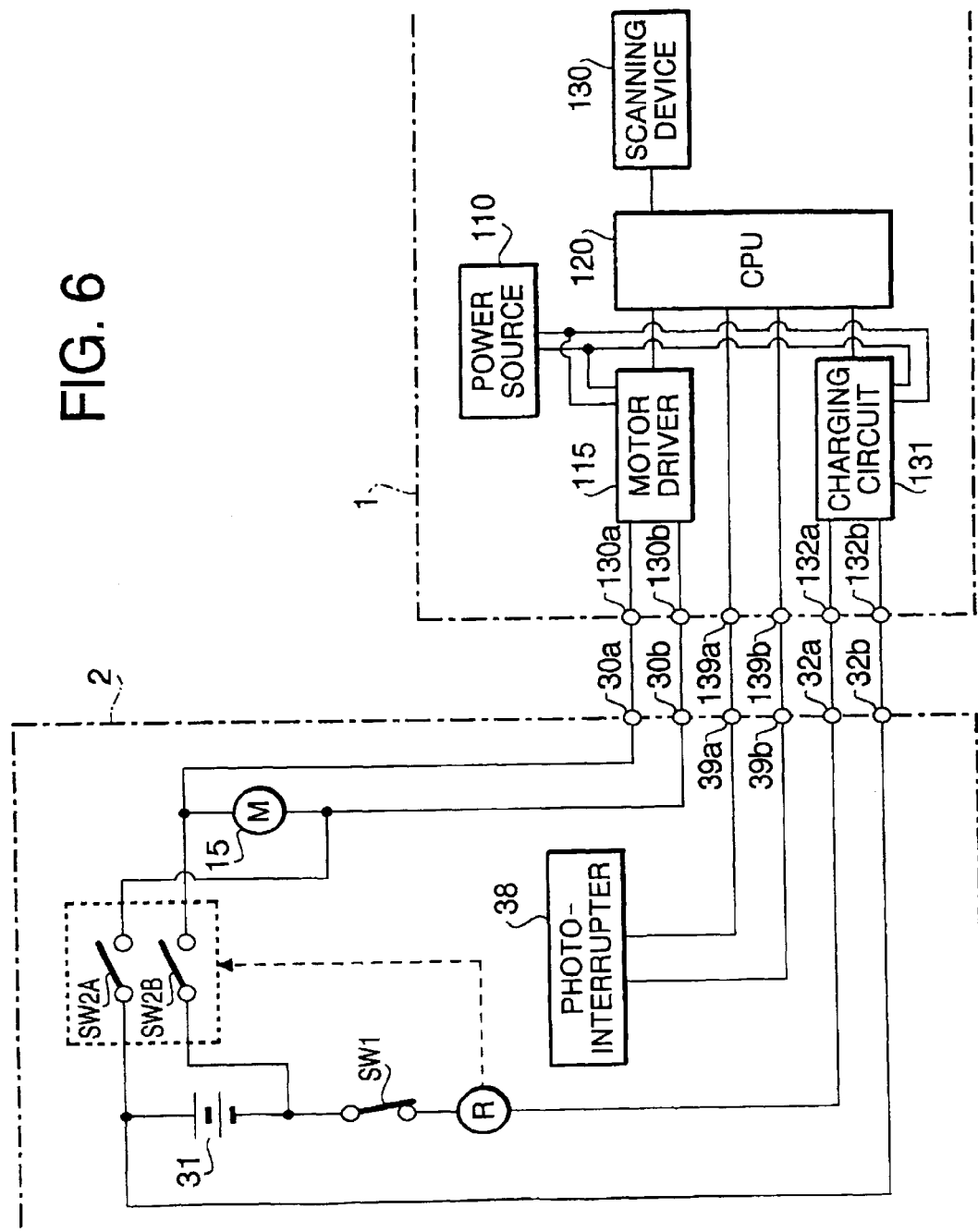
FIG. 6 is a diagram showing an electrical constitution of the film scanner and the cartridge film adapter.

FIG. 6 is a diagram showing an electrical constitution of the cartridge film adapter 2 for the winding/rewinding mechanism 14, and a control system provided in the film scanner 1 for driving the motor 15 and the like of the cartridge film adapter 2.

In FIG. 6, a switch SW1 represents contact between the plate springs 35 and 36. FIG. 6 shows a condition where the cartridge film adapter 2 is inserted in the film scanner 1, and the plate springs 35 contact the plate spring 36.

As shown in FIG. 6, the film cartridge adapter 2 is further provided with a relay switch R, and switches SW2A and SW2B. The switches SW2A and SW2B are constituted to open simultaneously when the switch SW1 is closed and the relay switch R is actuated; while the switches SW2A and SW2B are constituted to be simultaneously closed when the switch SW1 is opened and the relay switch R is not actuated.

The motor 15 is connected to the contacts 30a and 30b. One of the contacts of the switch SW2A is connected to the contact 30b, and one of the contacts of the switch SW2B is connected to the contact 30a. The battery 31, the switch SW1 and the relay switch R are connected in series, and the positive pole of the battery 31 is connected to the contact 32a. One of the electrodes of the relay switch R, which is not connected to the switch SW1, is connected to the contact 32b.

Further, an photo-interrupter 38 is provided, which outputs a pulse signal to the contacts 39a and 39b. Specifically, the photo-interrupter 38 is a so-called reflection type photo-interrupter including a light emitting element, and a light receiving element for receiving light which is emitted by the light emitting element and reflected by an object. The photo-interrupter emits light towards the film 6F at a side end portion where perforations are formed along the film feed direction. The film reflects the light emitted by the light emitting element to the light receiving element, while the perforation allows the light to pass through. Accordingly, as the film is fed, the light receiving element receives the reflected light intermittently, thereby a pulse signal is output by the photo-interrupter.

Figure 5:
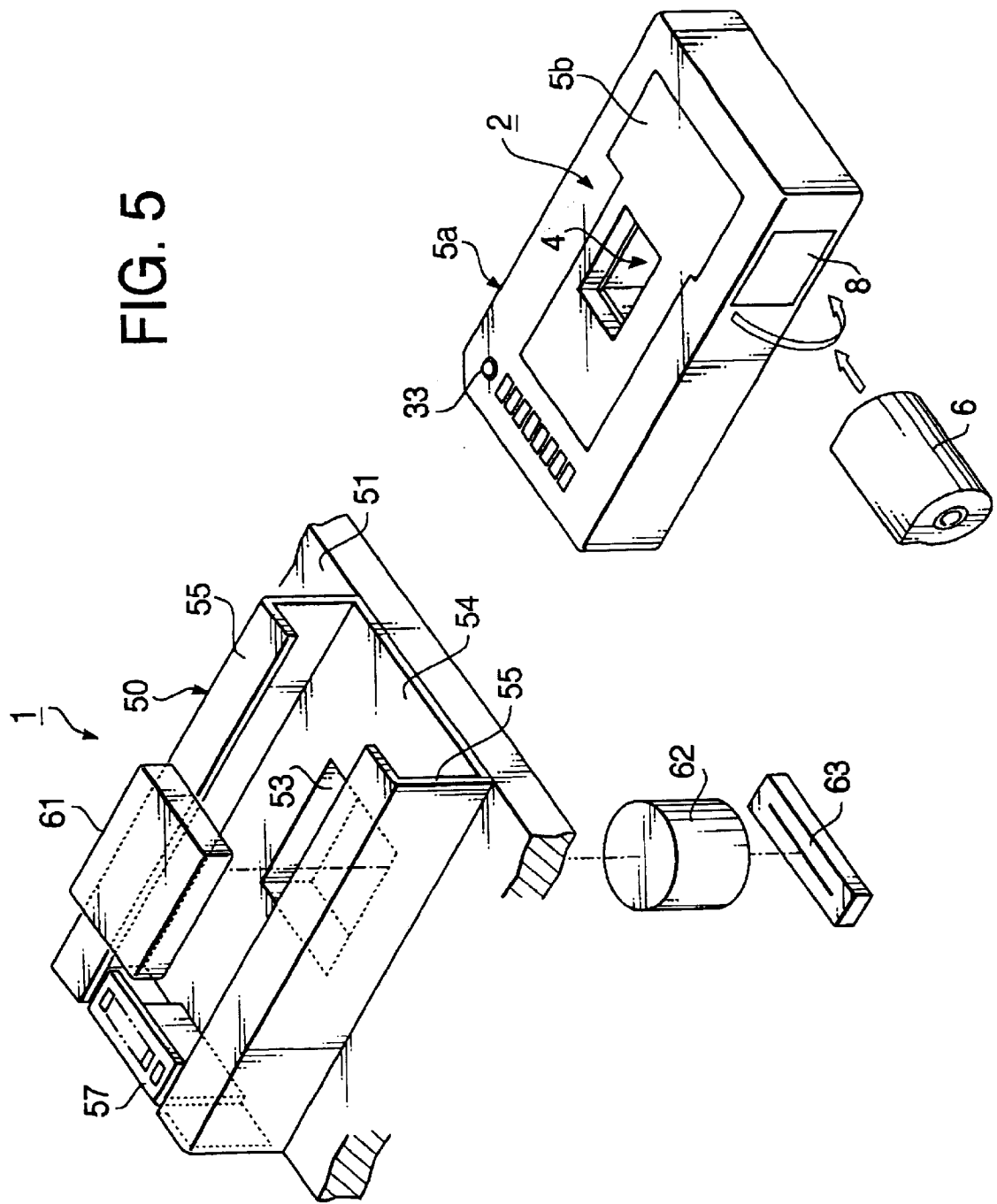

FIG. 5 shows a structure at the insertion opening 3 of the film scanner 1. At the insertion opening 3 of the film scanner 1, an adapter holder 54 is provided. The adapter holder 54 has a pair of rail members 55 which are elongated in a direction where the cartridge film adapter 2 is inserted. Each of the rail members 55 has an L-shaped cross section when cut on a plane perpendicular to its elongated direction. At a portion of the adapter holder 54, which faces the contacts 30a, 30b, 32a, 32b, 39a and 39b when the cartridge film adapter 2 is fully inserted in the adapter holder 54, a contact block 57 provided with a plurality of contacts 130a, 130b, 132a, 132b, 139a and 139b (see FIG. 6) respectively contact the contacts 30a, 30b, 32a, 32b, 39a and 39b of the cartridge film adapter 2 is provided.

The adapter holder 50 is formed with a scanning window 53 at a position corresponding to the opening 4 of the cartridge film adapter 2 when the cartridge film adapter 2 is fully inserted in the film scanner 1. In FIG. 5, above the scanning window 53, a back light 61, which emits diffused light towards the film from behind, is provided. On an opposite side, with respect to the scanning window 53, an imaging lens 62 and a line image sensor 63 are provided. By relatively moving the film and the image sensor 63, the image is scanned line by line.

As shown in FIG. 6, the contacts 130a and 130b are connected to a motor driver 115. The motor driver 115 applies, under control of a CPU (Central Processing Unit) 120, a predetermined voltage to the motor 15 through the contacts 130a, 130b, 30a and 30b. It should be noted that the motor driver 115 is capable of changing a polarity of the voltage applied to the motor 15. Specifically, when the motor 15 is driven to feed the film, the contact 130a is set to be positive, and the contact 130b is set to be negative; while when the motor 15 is driven to rewind the film, the contact 130a is negative, and the contact 130b is positive. As shown in FIG. 6, the motor driver 115 is also connected to a power source 110.

The contacts 132a and 132b are connected to a charging circuit 131 which is used for charging the secondary battery 31 accommodated in the cartridge film adapter 2. That is, the CPU 120 controls the charging circuit 131 to charge the secondary battery 31 by applying voltage through the contacts 132a and 132b, and 32a and 32b. The charging circuit 131 also utilizes electric power supplied from the power source 110.

Further, the CPU 120 controls a scanning device 130 for scanning an image formed on a film and located at the scanning window 53.

Sill further, the contacts 139a and 139b are connected to the CPU 120. Accordingly, the output signal of the photo-interrupter 38 is transmitted, through the contacts 39a, 39b, 139a and 139b, to the CPU 120.

With the constitution described above, when the cartridge film adapter 2 is inserted, through the insertion opening 3, in the film scanner 1, the switch SW1 (see FIG. 6) is closed (i.e., the plate spring 35 contacts the plate spring 36), and the switches SW2A and SW2B are opened. In this condition, the electric power for charging the secondary battery 31 is supplied from the charging circuit 131, through the contacts 132a, 132b, 32a and 32b. In this embodiment, the secondary battery 31 should be sufficiently charged so as to be used for rewinding a film.

Specifically, when the switch SW1 is opened, i.e., when the cartridge film adapter 2 is withdrawn from the film scanner 1 and the plate spring 35 does not contact the plate spring 36, the switches SW2A and SW2B are both closed. In this case, the motor 15 is connected to the secondary battery 31, and the secondary battery 31 is used as the power source for winding/rewinding mechanism 14.

As described above, when the contact 130a is positive and the contact 130b is negative, the motor 15 rotates forwardly, to feed or wind the film; while when the contact 130a is negative and the contact 130b is positive, the motor 15 rotates reversely, to rewind the film. Thus, when the secondary battery 31 is connected to the motor 15, the motor 15 rotates to rewind the film 6F.

Figure 7:
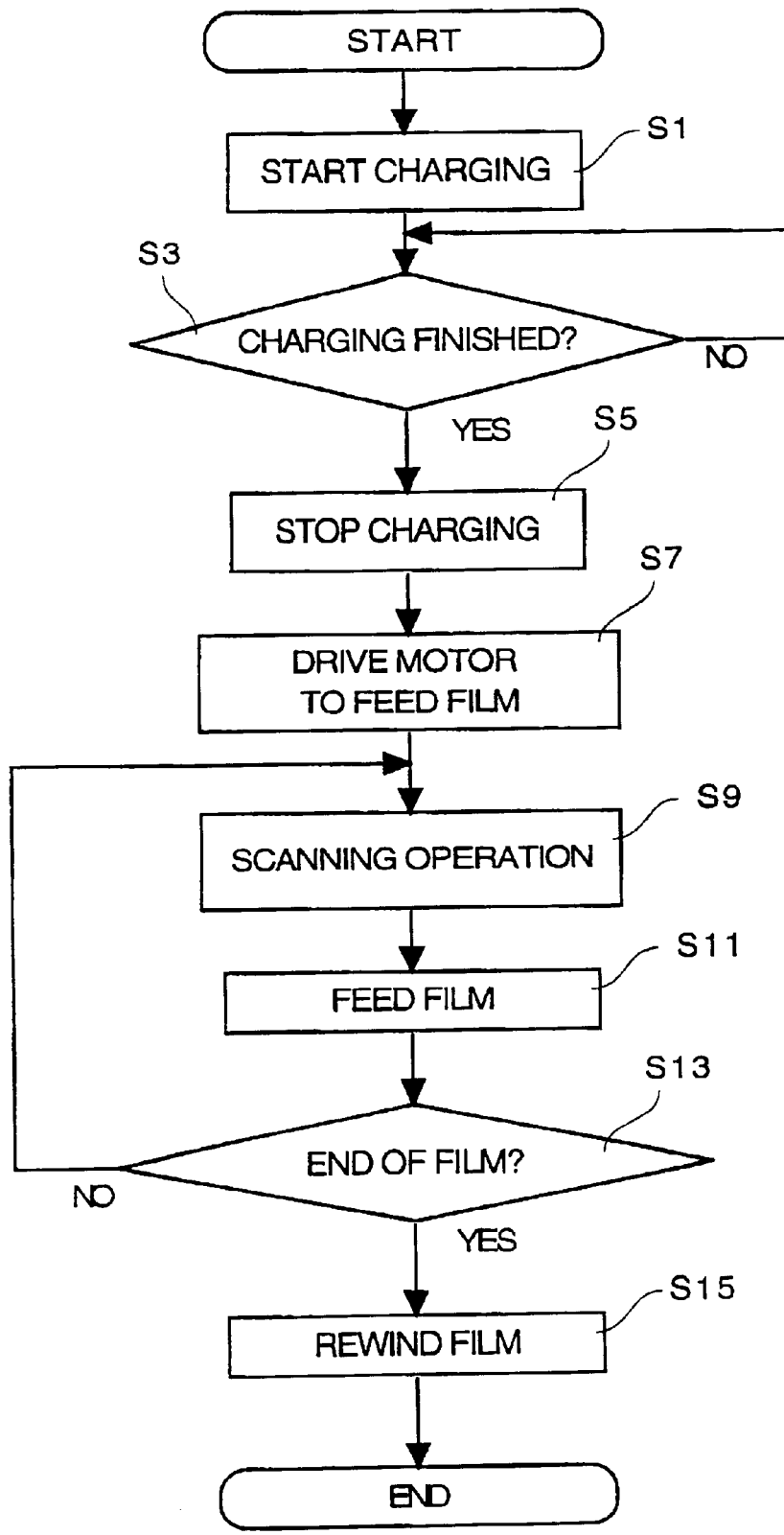
FIG. 7 is a flowchart illustrating an image scanning procedure according to a first embodiment of the invention.

FIG. 7 is a flowchart illustrating a first image scanning procedure according to a first embodiment of the invention. The procedure shown in FIG. 7 is performed by the CPU 120 of the film scanner 1.

In S1, when the cartridge film adapter 2 is inserted in the film scanner 1, the CPU 120 firstly drives the charging circuit 131 to charge the secondary battery 31. In this embodiment, the secondary battery 31 is constituted to have capacity for completely rewinding a film which has been fully extracted from the cartridge 6 and taken up by the spool section 10. In this embodiment, completion of rewinding is not detected and the battery 31 is always connected to the motor 15 when the cartridge film adapter 2 is not inserted in the film scanner 1. Thus, when the cartridge film adapter 2 is inserted in the film scanner 1, the battery 31 is completely discharged, and therefore, charging operation is executed every time when the cartridge film adapter 2 is inserted in the film scanner 1.

In S3, the CPU 120 detects whether charging is completed. If the charging is not completed (S3: NO), control repeats step S3. It should be noted that when the battery 31 is being charged, the driver 115 does not supply voltage to the motor 15.

If the charging is completed (S3: YES), control proceeds to S5, where the CPU 120 controls the charging circuit 131 to stop charging.

In S7, the CPU 120 controls the motor driver 115 to drive the motor 15 to feed the film accommodated in the film cartridge 6.

In S9, the CPU 120 controls the scanning device 130 to perform a scanning operation. Then, in S11, the CPU 120 controls the motor driver 115 to drive the motor 15 to wind the film by an amount corresponding to a frame of image.

In S13, the CPU 120 judges whether the end of the film is detected. As the film 6F is wound by an amount corresponding to one frame, the photo-interrupter 38 outputs a predetermined number of pulses. If the film 6F comes to the end, the film 6F will not be wound even if the motor 15 is driven. In such a case, the number of the pulses output by the photo-interrupter 38 is less than the predetermined number. Accordingly, by comparing the number of pulses output by the photo-interrupter 38 with a predetermined reference value, the end of the film can be detected.

If the end of the film is detected (S13: YES), the CPU 120 controls the motor driver 115 to change the polarity of the terminals 130a and 130b, and drive the motor 15 to rewind the film 6F. If the end of the film is not detected (S13: NO), then control returns to S9 where the scanning operation for a subsequent frame is performed.

If the cartridge film adapter 2 is withdrawn after S5 is finished, as described above, power supply from the film scanner 1 is disconnected, and the motor 15 is connected to the battery 31. Since the battery 31 is fully charged at S3, when the motor 15 is connected to the battery 31, rewinding of the film 6F is initiated. As described above, the capacity of the battery 31 is sufficient for completely rewind the fully extracted film 6F, and therefore, after the film cartridge adapter 2 is withdrawn from the film scanner 1, the film is completely rewound and accommodated in the film cartridge 6.

As described above, even if the cartridge film adapter 2 is withdrawn from the scanner before the film is completely rewound, it is ensured that the film will be completely rewound. Accordingly, the operator need not check whether the film is rewound, and the cartridge can be removed without any trouble. Further, since the film is rewound and accommodated in the film cartridge when the adapter is removed from the scanner, particles of dust may not be adhered and scratches may not be formed onto the film surface.

FIG. 8 schematically shows a constitution of the cartridge film adapter 2M according to the second embodiment.

The appearance of the cartridge film adapter 2M is substantially similar to the cartridge film adapter 2. For elements similar to those of the first embodiment, the same reference numerals are assigned.

The cartridge film adapter 2M has a body 5a and a back cover 5b. The body 5a is formed with a cartridge chamber 7 for holding a film cartridge 6. On a side surface of the cartridge film adapter 2, an openable cover plate 8 is provided at a position facing the film cartridge chamber 7. When the film cartridge 6 is inserted in the cartridge chamber 7 and the cover plate 8 is closed, a fork 9 provided in the cartridge chamber 7 is engaged with a rotation shaft of the film cartridge 6. On a side opposite to the cartridge chamber 7, with respect to the opening 4, a spool section 10 is formed for taking up the film 6F. A winding spool 11 is provided in the spool section 10. When the fork 9 is rotated to wind (i.e., to feed) the film 6F accommodated in the film cartridge 6, the film proceeds across the opening 4, and reaches the spool section 10. At the spool section 10, the film 6F is biased towards the winding spool 11 by a spool pressing member 12 provided on the body 5a and a film pressing member 13 provided on the back cover 5b. As the film is fed and the winding spool 11 is rotated, the film is taken up by the winding spool 11. It should be noted that the fork 9 and the winding spool 11 rotate simultaneously by the winding/rewinding mechanism 14, which is also employed in the first embodiment (see FIG. 3).

Rail members 40 are provided on both sides, in the direction perpendicular to the film winding/rewinding direction, of the opening 4. The rail members 40 includes a pair of inner rails 41b and 41b closely adjacent to the opening 4, and a pair of outer rails 41a and 41a located at outer portions of the inner rails 41b and 41b. Each of the inner and outer rails 41b, 41b, 41a and 41a extends in the direction parallel to the film winding/rewinding direction. When the back cover 5b is coupled to the main body 5a, the film 6F is nipped between the back cover 5b and the rail members 40, and thus slackening of the film 6F at the opening 4 is prevented.

Between one of the inner rail 41b and the outer rail 41a located on the same side of the opening 4, a reflection-type photo-interrupter 38 is provided for detecting perforations of the film 6F. Further, adjacent to the photo-interrupter 38, another reflection-type photo-interrupter 42 is provided between the inner rail 41b and the outer rail 41a for detecting presence of the film at the opening 4.

Similar to the first embodiment, a plurality of contacts 30a, 30b, 39a, 39b, 35a, 35b, 37a, 37b, 44a and 44b are provided on the upper surface of the body 5a. Next to the plurality of contacts, a switch mechanism 33 is provided. The constitution of the switch mechanism 33 is the same as that of the first embodiment, and shown in FIG. 4. Whether the cartridge film adapter 2M is inserted in the film scanner 1M is detected using the switch mechanism 33. On the opposite side of the plurality of the contacts, a solenoid 36 is provided. The solenoid 36 has a movable rod 45 which moves in the upper and lower directions in FIG. 8 when the solenoid 36 is driven.

The electrical power for the motor 15 is supplied from a power source of the film scanner 1M via motor power supply terminals 30a and 30b (shown in FIG. 8) provided on the body 5a.

FIG. 9 is a diagram showing an electrical constitution of the cartridge film adapter 2M for the winding/rewinding mechanism 4, and a control system provided in the film scanner 1M for driving the motor 15 and other devices of the cartridge film adapter 2M.

As shown in FIG. 9, the cartridge film adapter 2M is provided with the motor 15 for winding/rewinding the film 6F, a photo-interrupter 38 for outputting a pulse signal upon feeding of the film 6F, another photo-interrupter 42 for detecting whether a film is present at the opening 4, and a solenoid 36, function of which will be described later.

The electrodes of the motor 15 are respectively connected to the contacts 30a and 30b; the output terminals of the photo-interrupter 38 are respectively connected to the contacts 39a and 39b; the output terminals of the photo-interrupter 42 are respectively connected to the contacts 35a and 35b; the electrodes of the solenoid 36 are respectively connected to the contacts 37a and 37b; and the plate springs 35 and 36 are respectively connected with the contacts 44a and 44b.

FIG. 10 shows a structure at the insertion opening 3 of the film scanner 1M, which is a modification of the film scanner 1. At the insertion opening 3 of the film scanner 1M, an adapter holder 54 is provided. The adapter holder 54 has a pair of rail members 55 which are elongated in a direction where the cartridge film adapter 2M is inserted. Each of the rail members 55 has an L-shaped cross section when cut on a plane perpendicular to its elongated direction. At a portion of the adapter holder 54, which faces the contacts 30a, 30b, 35a, 35b, 39a, 39b, 37a, 37b, 44a and 44b when the cartridge film adapter 2M is fully inserted in the adapter holder 54, a contact block 57 provided with a plurality of contacts 130a, 130b, 135a, 135b, 139a, 139b, 137a, 137b, 144a and 144b (see FIG. 9) respectively contact the contacts 30a, 30b, 35a, 35b, 39a, 39b, 37a, 37b, 44a and 44b of the cartridge film adapter 2M are provided.

Further, on one of the rail members 55, at a portion facing the movable rod 45, an opening 145 is formed. When the cartridge film adapter 2M is fully inserted in the film scanner 1M and the movable rod 45 is moved to protrude from the upper surface of the main body 5a, the movable rod 45 is inserted in the opening 145, and thereby withdrawal of the cartridge film adapter 2M from the film scanner 1M is prevented.

The adapter holder 50 is formed with a scanning window 53 at a position corresponding to the opening 4 of the cartridge film adapter 2M when fully inserted in the film scanner 1M. In FIG. 10, above the scanning window 53, a back light 61 which emits diffused light towards the film 6F from behind is provided. On an opposite side, with respect to the scanning window 53, an imaging lens 62 and a line image sensor 113 are provided.

As shown in FIG. 9, the contacts 130a and 130b are connected to a motor driver 115. The motor driver 115 applies, under control of a CPU (Central Processing Unit) 210, a predetermined voltage to the motor 15 through the contacts 130a, 130b, 30a and 30b. Similar to the first embodiment, the motor driver 115 is capable of changing a polarity of the voltage applied to the motor 15. Specifically, when the motor 15 is driven to feed the film, the contact 130a is set to be positive, and the contact 130b is set to be negative; while when the motor 15 is driven to rewind the film, the contact 130a is negative, and the contact 130b is positive.

Further, the CPU 210 controls a scanning device 230 for scanning an image formed on a film and located at the scanning window 53.

Still further, the contacts 139a and 139b are connected to the CPU 210. Accordingly, the output signal of the photo-interrupter 38 is transmitted, through the contacts 39a, 39b, 139a and 139b, to the CPU 210.

Similarly, the contacts 135a and 135b are connected to the CPU 210. Accordingly, the output signal of the photo-interrupter 42 is transmitted, through the contacts 35a, 35b, 135a and 135b, to the CPU 210.

Furthermore, the contacts 144a and 144b are connected to the CPU 210. Accordingly, whether the plate springs 35 and 36 contact or not can be detected by the CPU 210 through the contacts 44a, 44b, 144a and 144b.

FIG. 11 is a flowchart illustrating an image scanning procedure according to a second embodiment of the invention. The procedure shown in FIG. 11 is performed by the CPU 210 of the film scanner 1M.

In S21, it is judged whether the cartridge film adapter 2M is inserted, through the insertion opening 3, in the film scanner 1M. If the cartridge film adapter 2M is inserted in the scanner 1M, the plate spring 35 contacts the plate spring 36, which is detected by the CPU 210 through the contacts 144a, 144b, 44a and 44b.

Until the cartridge film adapter 2M is inserted, the decision step S21 is repeated. If the cartridge film adapter 2M is inserted (S21: YES), control proceeds to S22.

In S22, the CPU 210 controls the motor driver 115 to drive the motor 15 to feed the film 6F accommodated in the film cartridge 6.

In S23, in accordance with the signal transmitted from the photo-interrupter 42, it is judged whether the film passed across the opening 4 (i.e., whether the film is bridged between the film cartridge 6 and the spool section 10).

If it is judged that the film has not yet been bridged between the film cartridge 6 and the spool section 10 (S23: NO), the CPU 210 repeats S22 and S23. If it is judged that the film is bridged between the film cartridge 6 and the spool section 10 (S23: YES), control proceeds to S24.

In S24, the CPU 210 controls the solenoid driver 136 to actuate the solenoid so that the rod 45 is protruded from the upper surface of the housing 5a. As described above, the rod 45 is inserted in the hole 145, i.e., the rod is engaged with the hole 145, and accordingly, withdrawal of the cartridge film adapter 2M from the film scanner 1M is prevented.

In S25, the CPU 210 controls the scanning device 230 to perform a scanning operation. Then, the CPU 210 controls the motor driver 115 to drive the motor 15 to wind the film by an amount corresponding to a frame of image.

In S26, the CPU 2100 judges whether the end of the film is detected. As the film 6F is wound by an amount corresponding to one frame, the photo-interrupter 38 outputs a predetermined number of pulses. If the film 6F comes to the end, the film 6F will not be wound even if the motor 15 is driven. In such a case, the number of the pulses output by the photo-interrupter 38 is less than the predetermined number. Accordingly, by comparing the number of pulses output by the photo-interrupter 38 with a predetermined reference value, the end of the film can be detected.

If the end of the film is detected (S26: YES), the CPU 210 controls the motor driver 115 to change the polarity of the terminals 130a and 130b, and drive the motor 15 to start rewinding the film 6F (S27). If the end of the film is not detected (S26: NO), then control returns to S25 where the scanning operation for a subsequent frame is performed.

In S28, based on the signal transmitted from the photo-interrupter 42, it is judged whether the film is present at the opening 4. If the film is present (S28: YES), rewinding operation is continued. If the film is absent (S28: NO), then, in S29, the CPU 210 controls the motor driver 115 to stop rewinding and controls the solenoid driver 136 to drive the solenoid 36 so that the rod 45 is retracted inside the housing 5a. As the rod 45 is retracted, the engagement between the film scanner 1M and the cartridge film adapter 2M is released, and the cartridge film adapter 2M is allowed to be removed from the film scanner 1M.

As described above, according to the second embodiment, the film adapter 2M is prevented from being withdrawn from the scanner before the film is completely rewound. Accordingly, the operator need not check whether the film is rewound, and when the film adapter 2M is withdrawn from the film scanner 1M, the film has already been rewound and accommodated in the film cartridge. Thus, particles of dust may not be adhered and scratches may not be formed onto the film surface.

The present disclosure relates to subject matters contained in Japanese Patent Applications Nos. HEI 10-182465 and HEI 10-182469, both filed on Jun. 29, 1998, which are expressly incorporated herein by in their entireties.

What is claimed is:

1. A cartridge film adapter for a film scanner, a cartridge film to be scanned by said film scanner being loaded in said cartridge film adapter, said cartridge film adapter being inserted in said film scanner when said film is scanned, said cartridge film adapter comprising:
   a detector that detects whether said cartridge film adapter is removed from said film scanner; and
   a film rewinder that rewinds said film when removal of said cartridge film adapter is detected by said detector.

2. The cartridge film adapter according to claim 1, further comprising a driver, said film rewinder being configured to receive power from said driver of said cartridge film adapter in response to said detector detecting removal of said cartridge film adapter from the film scanner.

3. The cartridge film adapter according to claim 2, said driver comprising a battery received within said cartridge film adapter.

4. The cartridge film adapter according to claim 3, said battery being configured to be recharged when said cartridge film adapter is loaded in said film scanner.

5. The cartridge film adapter according to claim 2, said rewinder further being configured to receive power from a power source external of said cartridge film adapter to rewind the film when removal of said cartridge film adapter from said film scanner has not been detected by said detector.

6. The cartridge film adapter according to claim 1, further comprising a motor that drives said film rewinder, said motor being driven from a battery to drive said film rewinder in response to detection by said detector that said cartridge film adapter has been removed from said film scanner.

7. The cartridge film adapter according to claim 6, said motor being configured to be driven by an alternate driver, separate from said battery, to drive said film rewinder when said cartridge film adapter is loaded in said film scanner.

8. A cartridge film adapter for a film scanner, a cartridge film to be scanned by said film scanner being loaded in said cartridge film adapter, said cartridge film adapter being inserted in said film scanner when said film is scanned, said cartridge film adapter comprising:
   a film rewinder;
   a battery for said film rewinder; and
   a switch mechanism which connects said battery and said film rewinder when said cartridge film adapter is removed from said film scanner.

9. A cartridge film scanning system including a film scanner and a cartridge film adapter for said film scanner, a cartridge film to be scanned by said film scanner being loaded in said cartridge film adapter, said cartridge film adapter being inserted in said film scanner when said film is scanned, wherein said cartridge film adapter comprises:
   a film rewinder;
   a battery for said film rewinder; and
   a switch mechanism which connects said battery and said film rewinder when said cartridge film adapter is removed from said film scanner.

10. The cartridge film scanning system according to claim 9, said film scanner comprising a power source selectively switchable to rewind said film through said battery and through an alternative driver.

11. The cartridge film scanning system according to claim 10, said film rewinder being driven by said battery when said cartridge film adapter is removed from said film scanner, said film rewinder being driven by said alternative driver when said cartridge film adapter is received within said film scanner.

12. The cartridge film scanning system according to claim 9, wherein said battery is a rechargeable battery, and wherein said film scanner comprises a charging circuit for charging said rechargeable battery.

13. The cartridge film scanning system according to claim 12, wherein said rechargeable battery has capacity necessary for completely rewinding a fully extracted film.

14. A cartridge film scanning system, comprising:
   a film scanner;
   a cartridge film adapter for said film scanner, a cartridge film to be scanned by said film scanner being loaded in said cartridge film adapter, said cartridge film adapter being inserted in said film scanner when said film is scanned, said cartridge film adapter including a film rewinder that rewinds said film upon removal of said cartridge film adapter from said film scanner.

15. The cartridge film scanning system according to claim 14, further comprising an engaging mechanism that engages said cartridge film adapter with said film scanner, engagement between said cartridge film adapter and said film scanner being released after said film is rewound.

16. The cartridge film scanning system according to claim 15, wherein said engaging mechanism comprises:
   a solenoid provided with a movable rod; and
   an engaging member which is engageable with and releasable from said movable rod,
   wherein said solenoid is provided to one of said film scanner and said cartridge film adapter, and said engaging member is provided to the other of said film scanner and said cartridge film adapter.

17. The cartridge film scanning system according to claim 16, said film scanner including a holder in which said cartridge film adapter is received, wherein said solenoid is provided to said cartridge film adapter, and said holder has an opening that is engageable with said movable rod.

18. The cartridge film scanning system according to claim 14, said film scanner comprising a scanning window at which a frame of image formed on said film is locatable, said cartridge film scanning system comprising a detector that detects whether or not a film is located at said scanning window, engagement between said cartridge film adapter and said film scanner being released if said detector detects that a film is not located at said scanning window.

19. The cartridge film scanning system according to claim 14, said film rewinder being configured to be driven by a battery when said cartridge film adapter is removed from said film scanner, and to be driven by an alternative driver when said cartridge film adapter is received within said film scanner.

20. The cartridge film scanning system according to claim 19, said alternate driver driving said film rewinder to rewind the film when scanning of the cartridge film by said film scanner is completed.

* * * * *